United States Patent
Goi et al.

(10) Patent No.: US 9,699,709 B2
(45) Date of Patent: Jul. 4, 2017

(54) NON-INVASIVE DIFFERENTIATED WIRELESS TRANSMISSION DETECTION

(71) Applicant: VERIZON PATENT AND LICENSING INC., Arlington, VA (US)

(72) Inventors: Sihao Goi, Paramus, NJ (US); Krishna Pichumani Iyer, Aurora, IL (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 262 days.

(21) Appl. No.: 14/556,721

(22) Filed: Dec. 1, 2014

(65) Prior Publication Data

US 2016/0157159 A1 Jun. 2, 2016

(51) Int. Cl.
*H04W 40/24* (2009.01)
*H04W 76/02* (2009.01)
*H04L 29/06* (2006.01)
*H04L 12/26* (2006.01)

(52) U.S. Cl.
CPC ....... *H04W 40/248* (2013.01); *H04L 43/0876* (2013.01); *H04L 65/1016* (2013.01); *H04W 76/021* (2013.01)

(58) Field of Classification Search
CPC ......... H04L 12/26; H04L 12/06; H04L 12/08; H04L 29/08; H04W 8/02; H04W 8/12; H04W 8/24; H04W 8/30; H04W 24/04; H04W 40/24; H04W 40/248; H04W 60/06; H04W 68/00; H04W 76/02; H04W 76/028; H04W 76/045; H04W 88/16
See application file for complete search history.

(56) References Cited

U.S. PATENT DOCUMENTS

| | | | | |
|---|---|---|---|---|
| 9,191,872 | B2* | 11/2015 | Janakiraman | H04W 36/14 |
| 9,420,607 | B1* | 8/2016 | Jain | H04W 76/027 |
| 2012/0207129 | A1* | 8/2012 | Sun | H04W 76/027 370/331 |

* cited by examiner

*Primary Examiner* — Alpus H Hsu
*Assistant Examiner* — Dharmesh Patel

(57) ABSTRACT

A non-intrusive method of determining whether a mobile device is transmitting through a Wi-Fi router or a cellular network is described. The method includes monitoring messages relating to a wireless network. A subset of the messages including Create Session Request, and IMSI/MDN are received and later a subset of the messages including Delete Session Request, and the IMSI/MDN are received. The combination of the sets of received messages is used to determine whether the mobile device is transmitting through the Wi-Fi router or the cellular network, specifically based on the Create Session Request and the Delete Session Request.

20 Claims, 8 Drawing Sheets

FIG. 1

NON-INVASIVE DIFFERENTIATED WIRELESS TRANSMISSION DETECTION

BACKGROUND

In an increasingly networked world, more and more traffic, such as data, voice, and video, is transmitted over public and proprietary networks. Wireless networks, in particular, are increasingly popular as networks though which subscribers obtain both voice services (e.g., telephone calls) and data services (e.g., email and web surfing).

An operator of a wireless network, such as a cellular network, may simultaneously operate a number of different wireless network technologies, such as a Third Generation (3G) cellular access network and a Fourth Generation (4G) cellular access network. In addition, Long-Term Evolution, or LTE, is a 4G wireless network technology, which is built on a High-Speed Downlink Packet Access 3G network protocol, and offers high-speed wireless cellular network connectivity through mobile computing devices. Furthermore, Wi-Fi is a wireless technology that enables several types of computing devices, including personal computers and mobile phones, to connect to a wireless network through a router.

LTE technologies provide data transfer speeds of between 100 megabits per second and one gigabit per second. The Wi-Fi standards transfer data between 11 Mbps and 600 Mbps. An assortment of conditions and situations can cause these speeds to vary, such as bad weather, network traffic and the capabilities of each device. The LTE standards enable connected devices and enable widespread network coverage, typically nationwide. Wi-Fi computing devices, however, must remain within 300 feet of a wireless router to maintain wireless network functionality.

Network providers, such as Verizon Wireless®, sell public mobile (usually cellular) network access or capacity to subscribers, with plans that typically impose a monthly usage allowance. For a fixed fee, subscribers can send and receive content up to their monthly usage allowance, after which they incur additional charges for additional units of data service usage. The allowance and further usage charges, however, are independent of the network conditions at times of data communications. In response, users of network capacity are sensitive to their total consumption but not sensitive to network loading levels. To satisfy user needs, access providers must build out their networks to handle large peaks in subscriber traffic. This situation is particularly problematic for the air interface, where interface traffic peaks, typically, occur only during limited time periods and on a limited number of cells. This leaves a huge amount of network data carrying capacity idle during non-peak periods.

Subscribers often prefer to off-load their data traffic to other network facilities that offer lower cost transport, such as Wi-Fi which usually does not involve a data volume based fee structure. It is advantageous for a network provider to know when and how much of its LTE network traffic is being off-loaded to a Wi-Fi network. The Wi-Fi off-load question is relevant, for example, during a large sports event, when the network provider may be operating its own Wi-Fi network, in addition to its own 3G, or 4G LTE network. A network provider may also want to know the Wi-Fi off-load factor for daily operations, such as how much of its own subscribers are off-loading their smartphone data traffic to a home Wi-Fi network (for example).

In general, knowing the Wi-Fi off-load factor helps the network provider determine how much is being saved using Wi-Fi, as compared to extending its own cellular network (for example, adding Cell-on-Wheels capability in a sports arena). Knowing the Wi-Fi off-load factor helps the network provider estimate and plan for large events. Hence, a need exists for providing a non-invasive method and system to detect that a device (for example, an Android device) is transmitting over Wi-Fi, instead of a cellular network.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Internet Protocol based (IP-based) cellular networks, including cellular networks based on a fourth-generation (4G) Long Term Evolution (LTE) standard provide significantly higher data rates than previous generations of cellular networks. In addition, IP-based cellular networks are increasingly expanding system architectures in order to address capacity and coverage issues.

The spectrum allocated to Wi-Fi networks is significantly greater than that allocated to cellular networks. Moreover, the spectrum allocated to Wi-Fi networks is unlicensed, thus incurring no additional spectrum licensing costs to the Wi-Fi providers. Therefore, mobile data off-loading from the IP-based cellular networks to Wi-Fi networks may be attractive mechanisms to mitigate the spectrum scarcity faced by fourth-generation and future-generation IP-based cellular networks.

Figure 1:
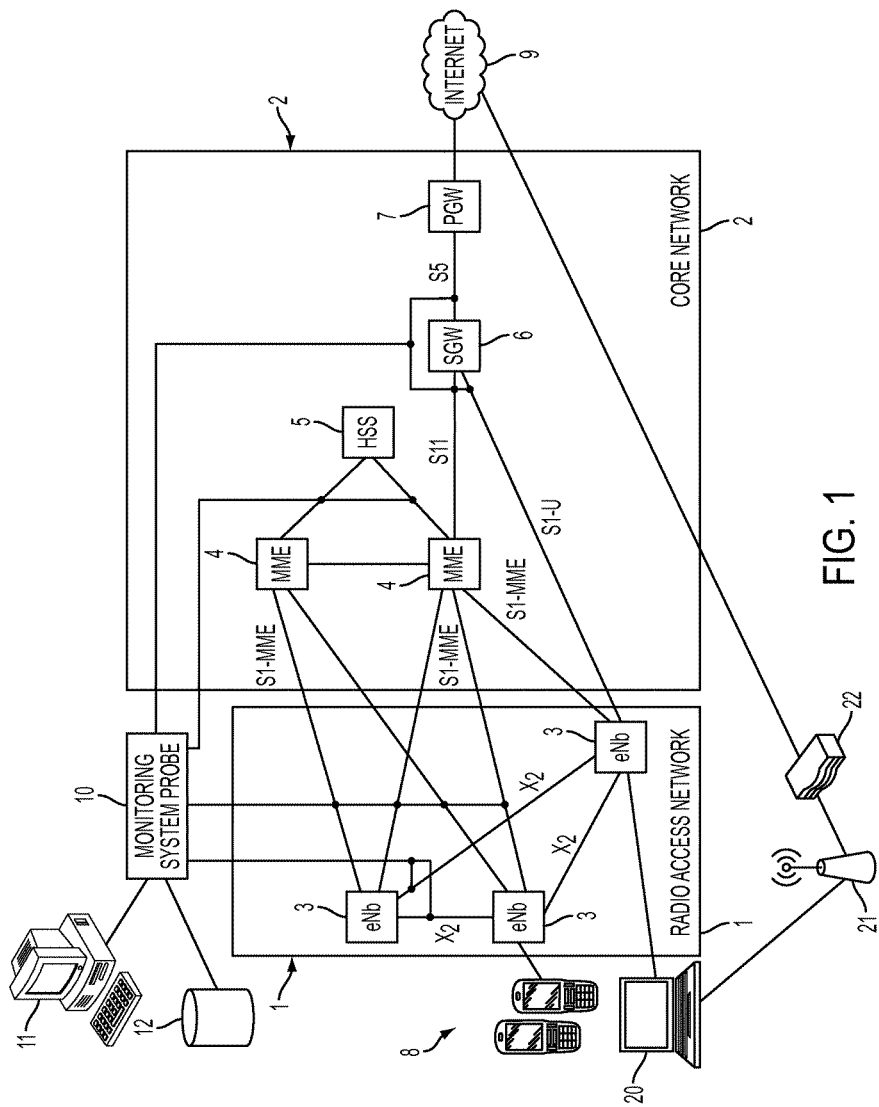
FIG. 1 is a high-level functional block diagram of a system architecture that supports a Radio Access Network and a Core Network, such as an IMS (IP Multimedia Subsystem). The architecture also includes Wi-Fi connectivity.

Reference is now made in detail to the examples illustrated in the accompanying drawings and discussed below. FIG. 1 is a block diagram illustrating a LTE network architecture. Although more details are discussed below, at a high level, the example implements a non-intrusive method that enables the mobile network service provider to determine whether a mobile device is transmitting through Wi-Fi or through the cellular mobile data network. A monitoring system probe 10 monitors signaling messages relating to data communications through the wireless network, which may transit a variety of logical interfaces between nodes of or devices communicating through the network. The monitoring system probe 10 receives a subset of the messages including Create Session Request as well as the International Mobile Subscriber Identity (IMSI) and/or mobile directory number (MDN) of the mobile device, and the monitoring system probe 10 later receives a subset of the messages including Delete Session Request, and the IMSI/MDN are received. The monitoring system probe 10 processes this combination of sets of received messages used to determine whether the mobile device is transmitting through a Wi-Fi router or through the cellular network, specifically based on the Create Session Request and the Delete Session Request.

The mobile network service provider can use the Wi-Fi usage determination in any of a variety of ways to improve operation or management of its cellular mobile data communications network facilities. For example, knowledge of recent off-load patterns of its customers may allow the network provider to deploy an appropriate collection of temporary resources in a venue to provide adequate Wi-Fi capacity in advance of a sporting event, to off-load traffic in a manner that reduces adverse loading impact on the cellular mobile data communications network facilities in or around the venue.

The provider collects various statistics on customer usage of the cellular mobile data communications network facilities; and equipment of provider manipulates that data to provide metrics and prediction helpful in detecting trends and planning future equipment deployments based on expect future customer usage demands. By collecting Wi-Fi usage statistics for large numbers of its customers throughout the territory served by its cellular mobile data communications network, and including Wi-Fi usage data as part of the customer data usage assessment, the mobile network service provider can more effectively assess future needs to deploy additional equipment for cellular mobile data communications.

Network providers, such as Verizon Wireless, sell public mobile (usually cellular) network access or capacity to subscribers, with plans that typically impose a monthly usage allowance. For a fixed fee, subscribers can send and receive content up to their monthly usage allowance, after which they incur additional charges for additional units of data service usage. The allowance and further usage charges, however, are independent of the network conditions at times of data communications. In response, users of network capacity are sensitive to their total consumption but not sensitive to network loading levels. To satisfy user needs, access providers must build out their networks to handle large peaks in subscriber traffic. This situation is particularly problematic for the air interface, where interface traffic peaks, typically, occur only during limited time periods and on a limited number of cells. This leaves a huge amount of network data carrying capacity idle during non-peak periods.

Subscribers often prefer to off-load their data traffic to other network facilities that offer lower cost transport, such as Wi-Fi which usually does not involve a data volume based fee structure. It is advantageous for a network provider to know when and how much of its LTE network traffic is being off-loaded to a Wi-Fi network. The Wi-Fi off-load question is relevant, for example, during a large sports event, when the network provider may be operating its own Wi-Fi network, in addition to its own 3G, or 4G LTE network. A network provider may also want to know the Wi-Fi off-load factor for daily operations, such as how much of its own subscribers are off-loading their smartphone data traffic to a home Wi-Fi network (for example).

In general, knowing the Wi-Fi off-load factor helps the network provider determine how much is being saved using Wi-Fi, as compared to extending its own cellular network (for example, adding Cell-on-Wheels capability in a sports arena). Knowing the Wi-Fi off-load factor helps the network provider estimate and plan for large events. Hence, a need exists for providing a non-invasive method and system to detect that a device (for example, an Android device) is transmitting over Wi-Fi, instead of a cellular network.

The LTE network technology represents mobile network evolution to provide high-rate IP-based services. A standardization entity has defined standards for mobile telecommunication systems, including both the radio access and the core network, designated as Radio Access Network 1 and Core Network 2, respectively.

The network includes a number of different types of nodes and interfaces. The nodes include, for example, an enhanced NodeB (eNodeB or eNB) 3, Mobility Management Entity (MME) 4, Home Subscriber Service (HSS) 5, Serving Gateway (SGW) 6, and Packet Gateway (PGW) 7. The interfaces between the nodes in the Core Network are generally named "S#." The "X2" interface (between eNodeBs) and the air interface between eNodeBs 3 and User Equipment 8 are in the Radio Access Network.

The following nodes operate within the Radio Access Network 1. User Equipment (UE) 8 is the subscriber endpoint of the end-to-end services. UE 8 communicates over the air path interface to eNodeB 3. The eNodeB 3 manages the radio path to UE 8 and hosts the radio link control and medium access control functions. The eNodeB also encrypts and decrypts data and handles the radio resource admission and management.

The following nodes operate within the Core Network 2. The MME 4 is the node responsible for managing the non access stratum (NAS) control messages from/to the UE 8. In addition, MME 4 plays a role in selecting SGW 6 for user traffic, coordinates handover in the LTE Radio Access Network 1 and establishes the necessary connections to HSS 5 for authentication and security procedures. The MME 4 also coordinates assignments to UE 8. The HSS 5 maintains subscriber profile and subscription data, subscriber identifiers (e.g. IMSI and Mobile Subscriber Integrated Services Digital Network Number (MSISDN)) and subscriber authentication and security data. The HSS 5 is the endpoint for UE 8 location updating procedures coming from MME 4. The SGW 6 is the endpoint of user connections from the eNodeBs 3. The SGW 6 is an anchor for user connections in case of UE handover between eNodeBs 3. The SGW 6 also manages charging features and Quality of Service (QoS) handling. The PGW 7 is the network node that provides an interface between Core Network 2 and external networks, such as the Internet 9.

Still referring to FIG. 1, mobile device 20 can take the form of portable handsets, smartphones or personal digital assistants, although they may be implemented in other form factors. For example, mobile device 20 includes a laptop or personal computer (PC), a tablet or e-reader, and a television (TV) or other display device. Mobile device 20 is capable of communicating with Radio Access Network 1 via an eNodeB 3. The mobile device 20 is also Wi-Fi capable via wireless access point 21 or Ethernet over cable or optical fiber connected directly to local router 22. For example, mobile device 20 can access web applications via Internet 9 directly by using a web browser and can bypass Networks 1 and 2.

A monitoring system probe 10 is coupled to various links in the LTE architecture to passively monitor and collect signaling data (or messages) from one or more interfaces in Networks 1 and 2. Monitoring system probe 10 collects data from various interfaces including, for example, the S1-MME and S11 interfaces that terminate at MME 4, the S1-MME and X2 interfaces that terminate at eNodeB 3, and the S11 and S1-U interfaces that terminate at SGW 6. It will be understood that some or all of the other interfaces or links in the network may also be monitored by monitoring system probe 10. The monitoring system probe 10 may comprise, in one embodiment, one or more processors running one or more software applications that collect, correlate and analyze data packets from Network 1 and Network 2.

Monitoring system probe 10 incorporates a protocol analyzer, session analyzer, and/or traffic analyzer functionality that provides troubleshooting by characterizing IP traffic by links, nodes, applications and servers on the network. Such functionality is provided, for example, by the 9900 WNG (Wireless Network Guardian) Detector. Although a single monitoring system probe 10 is illustrated in FIG. 1, it will be understood that this is for the sake of simplification and that any number of interconnected monitoring system probes may be coupled to one or more interfaces within the LTE architecture. A single monitoring probe 10 may capture data from a particular interface, or two or more probes may be coupled to one interface.

Monitoring system probe 10 passively captures message traffic from the interfaces without interrupting the network's operation. A service provider or network operator accesses data from monitoring system probe 10 via a user interface station 11. Monitoring system probe 10 further comprises internal or external memory 12 for storing captured data packets, user session data, call record configuration information, and software application instructions. Monitoring system probe 10 captures and correlates the packets associated with specific data sessions on the network interfaces. The captured information includes Create Session Requests and associated IMSIs and/or MDN of the mobile devices that request session creation as well as Delete Session Requests and/or MDN of the mobile devices that request session deletion. From the captured information, the monitoring system probe 10 and/or the computer serving as the user interface station 11 distinguishes when a UE device transitions between data communication through the cellular network facilities and data communication via a Wi-Fi service, such as that provided by wireless access point 21 and router 22. Further processing of data based on Wi-Fi usage related determinations may be provided by the monitoring system probe 10, user interface station 11 and/or other computer equipment of the carrier (not separately shown).

For purposes of further discussion, various functions of mobile devices are now described by reference to FIGS. 2 and 3. For a given communication, an application program within the mobile device or the web browser executing on devices 20 and 8 may be considered a 'client', and programming within or coupled for communications through Networks 1 and 2 may be considered a 'server' application for the particular communication. It may be useful to consider the functional elements/aspects of examples of two types of mobile devices at a high level.

Figure 2:
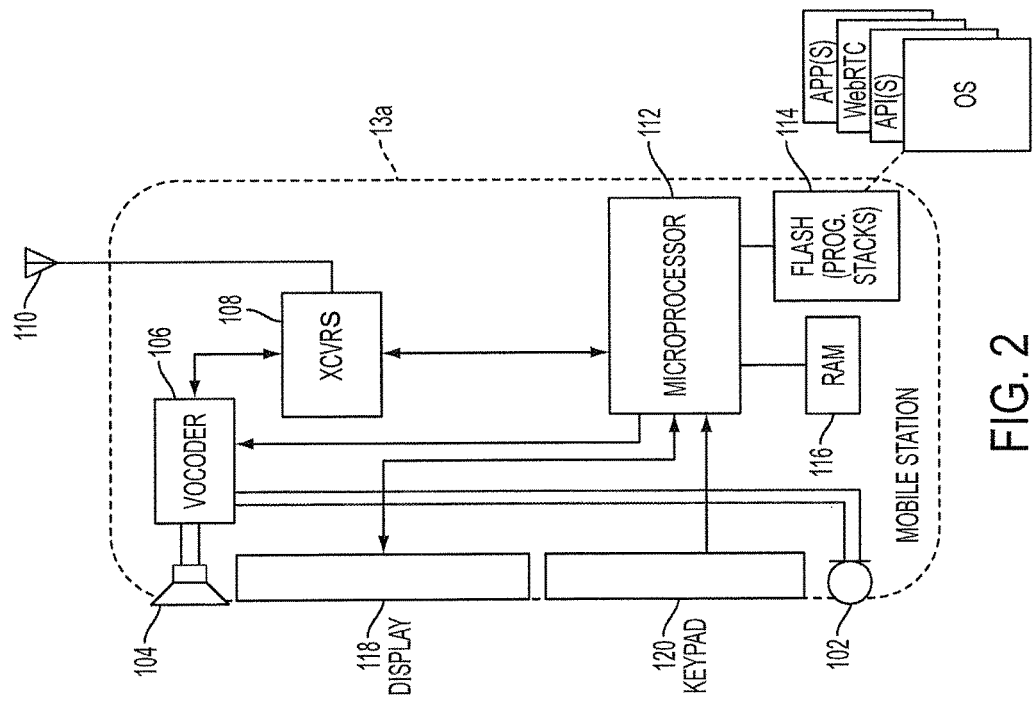

FIG. 2 provides a block diagram illustration of an example of a non-touch type mobile device 13*a*. Although the mobile device 13*a* may be a smart-phone or may be incorporated into another device, such as a personal digital assistant (PDA) or the like, for discussion purposes, the illustration shows the mobile device 13*a* in the form of a handset. The handset embodiment of mobile device 13*a* functions as a normal digital wireless telephone station. For that function, the station 13*a* includes a microphone 102 for audio signal input and a speaker 104 for audio signal output. The microphone 102 and speaker 104 connect to voice coding and decoding circuitry (vocoder) 106. For a voice telephone call, for example, vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, including wireless data communications, handset 13*a* also includes at least one digital transceiver (XCVR) 108. The handset 13*a* is configured for digital wireless communications using one or more of the common network technology types. The mobile device 13*a* may also be capable of analog operation via a legacy network technology.

The transceiver 108 provides two-way wireless communication of information, such as vocoded speech samples and/or digital information, in accordance with the technology of Networks 1 and 2. The transceiver 108 also sends and receives a variety of messages in support of the various voice and data services provided via mobile device 13*a* and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

It will be appreciated that the transceiver may be a plurality of transceivers 108. For example, an embodiment of the present application, which includes communicating with an LTE network as well as a Wi-Fi network, requires two separate transceivers.

The mobile device 13*a* includes a display 118 for displaying messages, menus or the like, call related information dialed by the user, calling party numbers, etc. A keypad 120 enables dialing digits for voice and/or data calls as well as generating input selection, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

A microprocessor 112 serves as a programmable controller for mobile device 13*a*, in that it controls all operations of the device in accord with programming that it executes for all operations. In the example, mobile device 13*a* includes flash type program memory 114 for storage of various "software" or "firmware" program routines and mobile configuration settings, such as MDN and/or mobile identification number (MIN), etc. The mobile device 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, application programming interface(s) (APIs), call processing software, and vocoder control software, and any of a wide variety of other applications, such as client browser software and short message service software, any of which may operate with active user intervention or in the background without user intervention. The APIs include control messages (e.g. protocol(s) supported on the IMS) for generating, delivering, receiving, and processing messages. The memories 114, 116 also store various data, such as telephone numbers and server addresses, downloaded data such as multimedia content, and various data inputted by a user. Programming stored in the flash type program memory 114, sometimes referred to as "firmware," is loaded into and executed by microprocessor 112.

Figure 3:
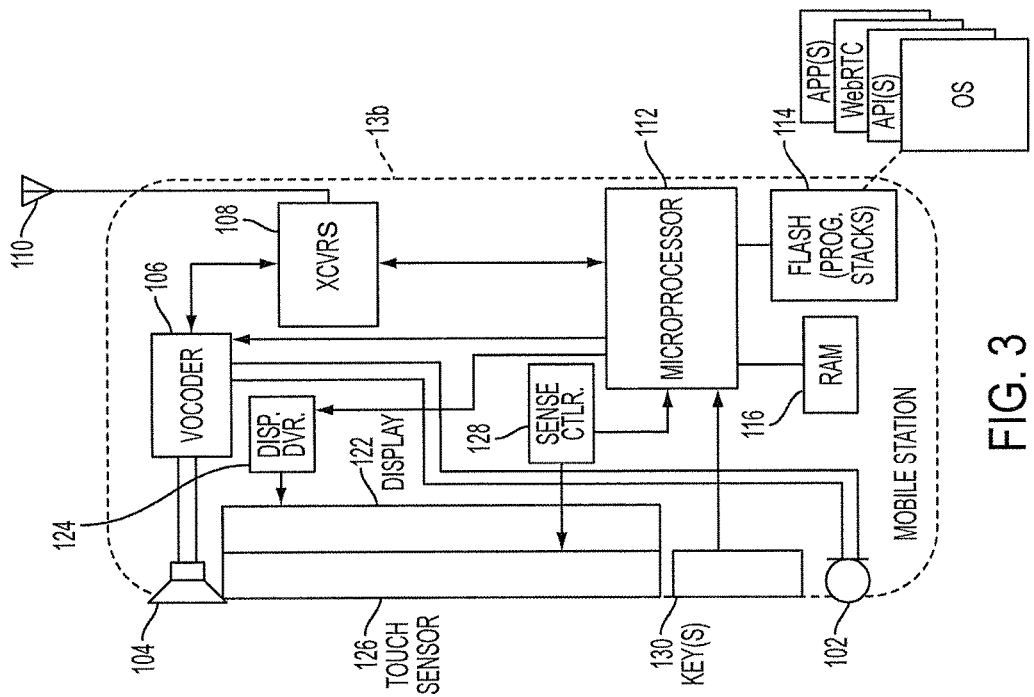
FIGS. 2 and 3 are block diagrams of example User Equipment (UE) devices.

FIG. 3 provides a block diagram illustration of an example of a touch screen type mobile device 13b. Although possibly configured somewhat differently, at least logically, a number of the elements of the touch screen type mobile device 13b are similar to the elements of mobile device 13a, and are identified by like reference numbers in FIG. 3. For example, the touch screen type mobile device 13b includes microphone 102, speaker 104 and vocoder 106 for audio input and output functions, much like in the earlier example. The mobile device 13b also includes at least two digital transceivers (XCVR) 108 for digital wireless communications. The concepts discussed here encompass embodiments of mobile device 13b utilizing any digital transceivers that conform to current or future developed digital wireless communication standards. As in mobile device 13a, transceivers 108 provide two-way wireless communication of information, such as vocoded speech samples and/or digital information. The transceivers 108 also send and receive a variety of messages in support of the various voice and data services provided via mobile device 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of mobile device 13a, a microprocessor 112 serves as a programmable controller for mobile device 13b, in that it controls all operations of mobile device 13b in accord with programming that it executes for all operations. In the example, mobile device 13b includes flash type program memory 114 for storage of various program routines and mobile configuration settings. The mobile device 13b may also include a non-volatile random access memory (RAM) 116 for a working data processing memory. Of course, other storage devices or configurations may be added to or substituted for those in the example. Similar to the implementation of mobile device 13a, the flash type program memory 114 stores firmware such as a boot routine, device driver software, an operating system, API(s), call processing software, and vocoder control software, and any of a wide variety of other applications, such as client browser software and short message service software, any of which may operate with active user intervention or in the background without user intervention. The APIs include control messages for generating, delivering, receiving, and processing signaling messages with and/or via a network, such as Core Network 2.

In the example of FIG. 2, the user interface elements included a display and a keypad. The mobile device 13b may have a limited number of keys 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the mobile device 13b in the example includes a display 122, which microprocessor 112 controls via a display driver 124, to present visible outputs to the device user. The mobile device 13b also includes a touch/position sensor 126. The sensor 126 is relatively transparent, so that the user may view the information presented on display 122. A sense circuit 128 sensing signals from elements of touch/position sensor 126 detects occurrence and position of each touch of the screen formed by display 122 and sensor 126. The sense circuit 128 provides touch position information to microprocessor 112, which can correlate that information to the information currently displayed via display 122 to determine the nature of user input via the screen.

The display 122 and touch sensor 126 (and possibly one, or more keys 130, if included) are the physical elements providing the textual and graphical user interface for mobile device 13b. The microphone 102 and speaker 104 may be used as additional user interface elements for audio input and output.

Returning now to FIG. 1, monitoring system probe 10 while monitoring interfaces obtains a number of messages relating to mobile devices 8 and 20, and Networks 1 and 2. Table I lists an example set of parameters (also referred to as messages) and the possible interfaces from which each parameter is obtained.

TABLE I

| PARAMETER OR MESSAGE | INTERFACE DRAWN FROM |
| --- | --- |
| MDN | S1U |
| IMSI | S1U |
| IMEI | S1U |
| Time Stamp | S1U |
| Start | S5 |
| Stop | S5 |
| Device IP address | S1U, S5, S11 |
| Protocol Type | S1U, S5, S11 |
| Protocol Name | S1U, S5, S11 |
| Device Dormancy Status | S1U, S5, S11 |
| Dormancy Time | S1U, S5, S11 |
| Cell Site Type | S1U, S5, S11 |
| Cell Site Sectors | S1U, S5, S11 |
| Cell Site Sector Status | S1U, S5, S11 |
| Internet Connect/Disconnect | S1U, S5, S11 |
| IMS Connect/Disconnect | S1U, S5, S11 |

As shown in Table I, the Mobile Device Number (MDN) may be obtained from the S1U interface, the International Mobile Subscriber Identity (IMSI) of a mobile device may be obtained from the S1U interface, and the International Mobile Equipment Identity (IMEI) number may also be obtained from the S1U interface. A time value (Time Stamp)

relating to communications of a mobile device between the base station and SGW 6 may be obtained from the S1U interface. Start and Stop times relating to communications of a mobile device between SGW 6 and PGW 7 may be obtained from the S5 interface. The IP address assigned to a mobile device (Device IP Address) may be obtained from a number of possible interfaces, including: S1U, S5 and S11. A number of other parameters may be obtained from this set of interfaces S115, S5 and S11 including: a protocol type, protocol name, a dormancy status of a mobile device (Device Dormancy Status), the amount of time a mobile device is in a dormancy state (Dormancy Time), a protocol transport type, a cell site type and sector information relating to a cell site (Cell Site Sector Status). Other messages may be obtained from the interfaces in the networks. These messages obtained by system probe 10 may be, for example, configured by a network administrator or another party.

Figure 4:
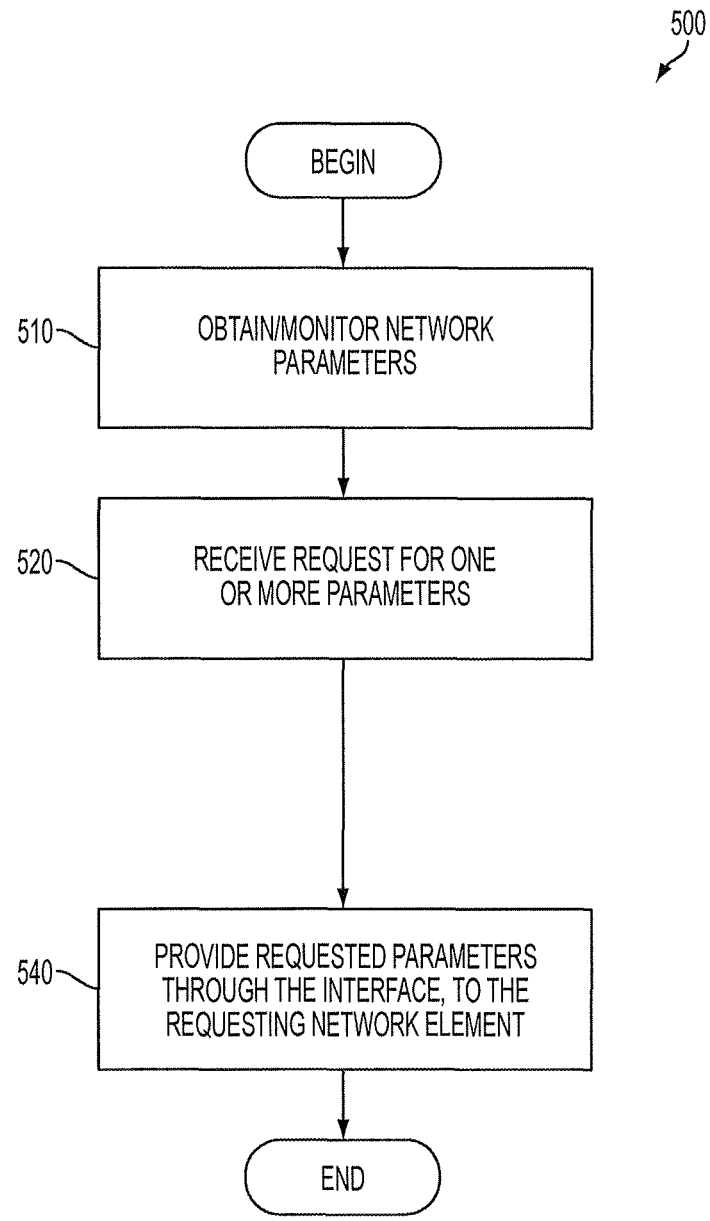
FIG. 4 is a flow chart illustrating an example process for providing a generic interface to requesting network elements in the system architecture shown in FIG. 1.
Figure 5:
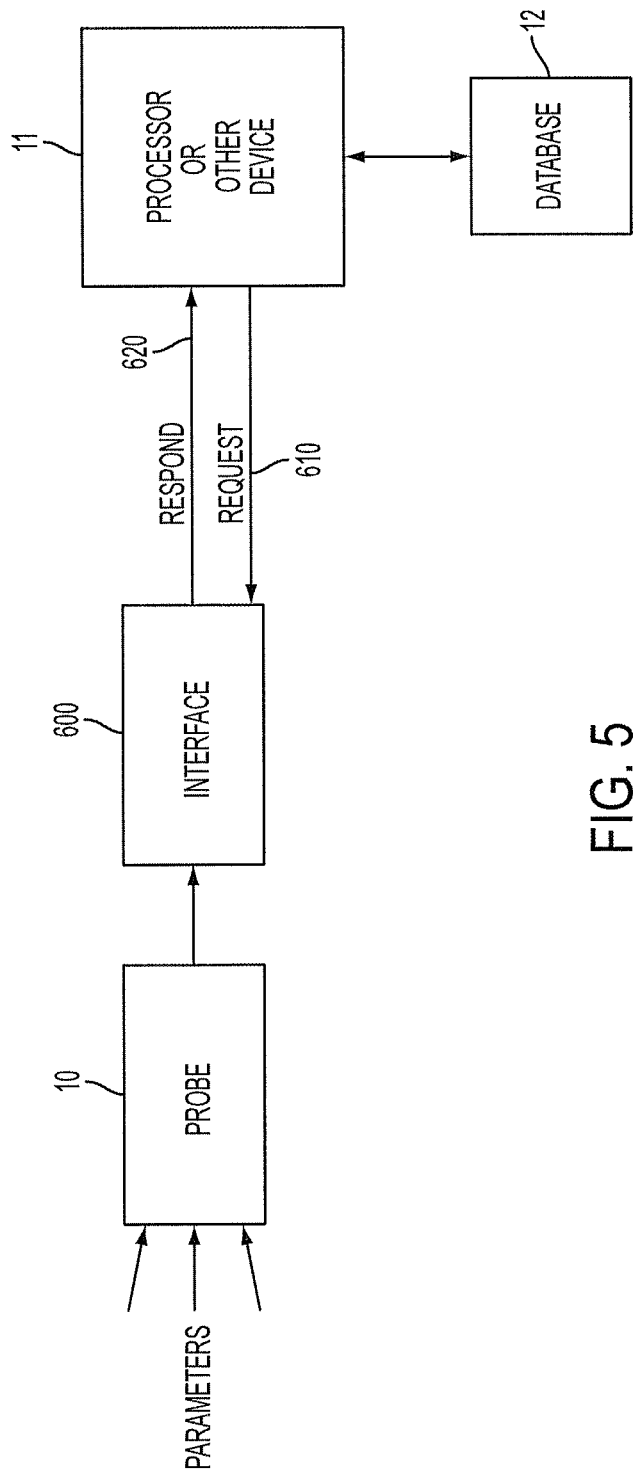
FIG. 5 is an example application of a processor connected to various interfaces in the system architecture shown in FIG. 1 in order to gather information or messages flowing between the various elements.

FIG. 4 is a flow chart illustrating an example process 500 for providing an interface to requesting network elements. In one implementation, process 500 is performed by network probe 10a, interface component 600 (FIG. 5) and/or a processor 11 (FIG. 5). In some implementations, the functionality of network probe 10a and interface component 600 may be combined and implemented by a single device. It will be appreciated that monitoring system probe 10 in FIG. 1 includes network probe 10a and interface component 600, the latter shown in FIG. 5.

Process 500 includes obtaining and/or monitoring network parameters (block 510), which are obtained from various interfaces in Network 1 and Network 2. In one implementation, the network probe 10a obtains the network parameters and forwards them to interface component 600. Process 500 further includes receiving a request for one or more network parameters (block 520). The request may be from, for example, a processor 11 (FIG. 5), which specifies a list of parameters in which the processor 11 is interested. In this manner, the requesting processor 11 can obtain all or a subset of the parameters listed in Table 1. Block 540 provides the requested parameters through the interface. In this manner, a custom set of parameters can be provided to a requesting processor or any other device.

FIG. 5 is a diagram illustrating an example application of the techniques discussed with respect to process 500. As illustrated in FIG. 1, network probe 10a can connect to various interfaces in Network 1 and Network 2 and gather information relating to mobile devices and/or Networks 1 and 2. The gathered information can include, for example, parameters shown in Table I. It will be appreciated that network probe 10a automatically monitors and gathers the information without any human intervention. The network probe 10a gathers the information (for example, the parameters listed in Table 1) between the times of power ON and Power OFF.

Although shown as a standalone interface buffer connected for data transfers between the probe 10a and the processor 11 in FIG. 5, the interface component 600 may be implemented within monitoring system probe 10 or within processor 11 as firmware or software to accommodate requests of parameters. In this manner, interface component 600 may be designed to accommodate specific requests from processor 11. For example, probe 10a may receive all the parameters listed in Table I. The processors 11 may, however, only request a subset of the listed parameters that are necessary to identify a mobile device joining the Internet at a particular time. The interface component 600 may be designed to accommodate such a request. For example, as illustrated in FIG. 5, request parameters 610 can be sent to interface component 600. Request parameters 610 can include a list of the parameters needed by processor 11. In response, probe 10a, by way of interface 600, sends a response 620 to processor 11 that includes the requested parameters. The processor 11 may request parameters on an on-demand basis, e.g. when carrier personnel intend to perform a network analysis based at least in part on Wi-Fi usage statistics; or the processor 11 may request parameters automatically, e.g. on a programmed periodic basis. It will be understood that the handshaking between processor 11 and probe 10 may be implemented to send all the data (parameters) acquired by the probe to processor 11. In turn, processor 11 may be programmed to sort and correlate the parameters. Stated differently, the sorting and correlation may be based on desired parameters associated with each mobile device communicating through Networks 1 and 2 (see FIGS. 1, 6 and 7), as later described.

Having described the manner in which processor 11 can obtain messages from probe 10a, another aspect of the application will now be described by reference to FIGS. 6 and 7. When a user powers up mobile device 20 (for example), the device searches the radio waves for a signal from the cellular data communication network and establishes a link to an eNodeB 3 (FIG. 1) at the physical layer in response to detection of an appropriate signal from that eNodeB. Next, the higher layer links are established. Network 2 processes the authentication, authorization and accounting checks for mobile device 20. If these checks pass, then device 20 establishes links to the Internet APN and the Internet Multimedia Subsystem (IMS) APN (an IMS includes HSS 5, SGW 6 and PGW shown in Core Network 2 in FIG. 1). This is shown on a high level in FIG. 6. It will be understood that the IMS APN and the Internet APN are logical identifiers that define the link or Packet Data Network (PDN) to which the mobile device, or the UE requests connectivity. For example, the IMS APN link has a higher priority of data transmission through the network than does the Internet APN link.

Figure 6:
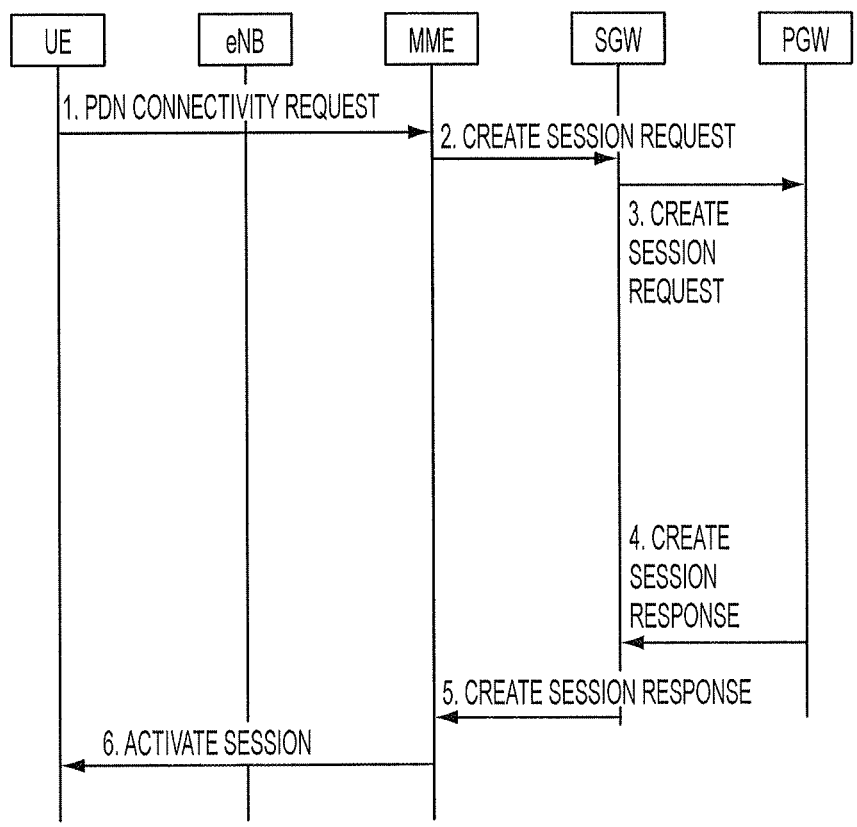
FIG. 6 is a high level flow diagram illustrating a process for connecting a UE to an IMS Access Point Name (APN).
Figure 7:
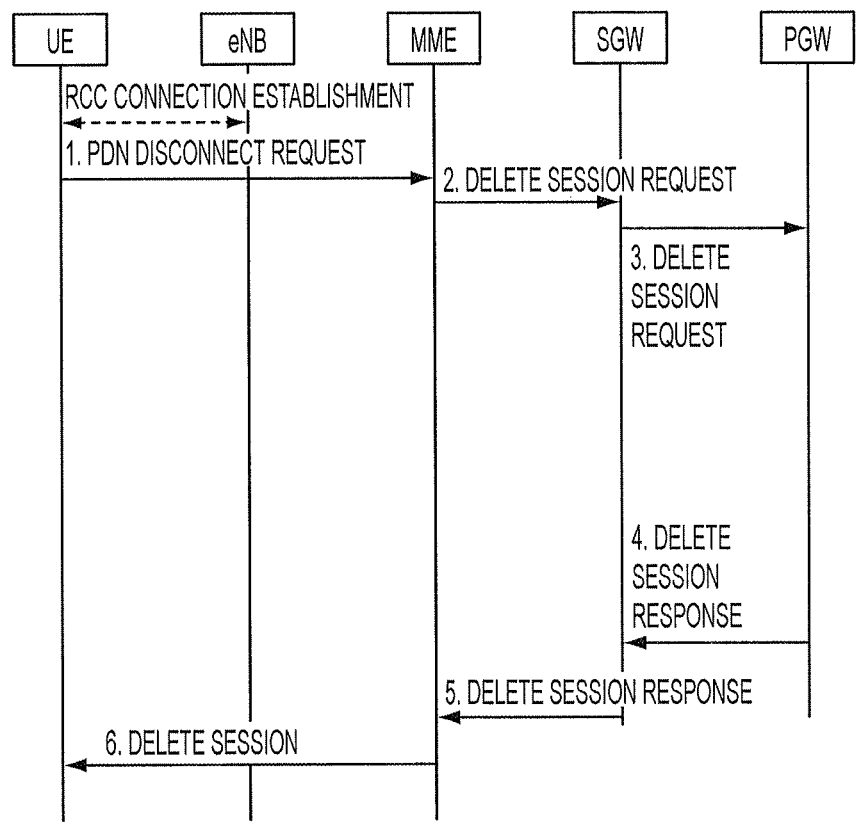
FIG. 7 is a high level flow diagram illustrating a process for disconnecting a UE from an IMS APN.

As shown in FIG. 6, device 20 (the UE) initiates a new Packet Data Network (PDN) connection by sending a PDN Connectivity Request to MME 4 by way of eNB 3. The PDN Connectivity Request includes multiple messages that can be picked up by system probe 10 on the S1-MME link (FIG. 1). The messages (also referred to herein as parameters) include an identity of the UE 20, namely, the IMSI and/or the MDN (Table I). If HSS 5 (FIG. 1) determines that the mobile device is authorized and has the appropriate credentials based on the subscription record for the device 20, the MME 4 sends a Create Session Request to the SGW 6 by way of the S11 interface and, in turn, the SGW 6 sends a Create Session Request to the PGW 7 by way of the S5 interface. The PGW 7 then becomes the communications interface to another device (not shown) or another network (such as Internet 9). The reverse messages are also shown in FIG. 6, whereby the UE is informed that the session is now activated. Uplink and downlink data may then flow between the UE and the other device or the other network. With these links established, the service provider network formed by Radio Access Network 1 and Core Network 2 allows the mobile device 20 to use the data transport service and other services of the provider's network. Of note for purposes of the present discussion, such usage includes data communications (e.g. with the Internet 9) through Radio Access Network 1 and Core Network 2.

In operation, the monitoring system probe 10 can receive the various parameters from the multiple links in Core Network 2, in particular, the following two parameters and their respective time stamps: Create Session Request for connectivity between the UE and the Internet APN and the IMS APN. The identity of the mobile device is also picked up by the monitoring system probe 10 as the IMSI and/or the MDN.

When the UE 20 desires to power down, a process in reverse to the process shown in FIG. 6 is initiated. This process is shown in FIG. 7. As shown, the UE 20 sends a PDN Disconnect Request to the MME by way of the eNodeB 3 (FIG. 1). In turn, the MME sends a Delete Session Request to the SGW, and the latter sends a Delete Session Request to the PGW. The PGW informs the other network, or the other device that the communication session is about to be terminated. The reverse process for termination is also shown in FIG. 7, as the UE is informed that the current communication session is terminated or deleted. The system probe 10 can selectively receive the various messages from the multiple links in Core Network 2, in particular, the following two parameters and their respective time stamps: Delete Session Requests to disconnect the UE from the Internet APN and the IMS APN (Table I). The identity of the mobile device 20 is also picked up by the monitoring system probe as the IMSI and/or the MDN.

It will now be assumed that the user desires to activate mobile device 20 to communicate on Wi-Fi with the other network or the other device. For example, the user of mobile device 20 may desire to use a home router 22 for direct access to Internet 9 (FIG. 1) for streaming video data, but may also desire to use Core Network 2 (or the IMS) for Voice-over-IP (VoIP), e.g. for regular telephone calls. It will now also be assumed that the user can enable Wi-Fi on mobile device 20 (for example, a user can enable Wi-Fi on an Android device). Upon enabling Wi-Fi, the process described above (FIG. 7) disconnects the mobile device from the session indicated by the Internet APN, but the session indicated by the IMS APN remains active. Thus, monitoring system probe 10 now receives the following parameters and its time stamp, namely, Delete Session Request relative to the link or session previously associated with the Internet APN.

When Wi-Fi is disabled, the mobile device connects a session again based on the Internet APN using the process shown in FIG. 6, while the IMS connection remains active.

Accordingly, an aspect of the present application uses the monitoring system probe 10 to automatically track the PDN connect time duration and the PDN disconnect time duration for a particular mobile device. PDN disconnect time duration, while the IMS connection remains active, can be used as a general indicator of a duration of time that a mobile station such as 20 is connected to Wi-Fi instead of connecting for data communication through the Networks 1 and 2.

The monitoring system probe 10, thus, monitors the S1U, S5 and S11 links for the following parameters shown in Table I and their durations: Internet Connect, Internet Disconnect, IMS Connect, IMS Disconnect, and IMSI or the MDN as an identifier of the mobile device associated with connection and disconnection. By calculating the time a mobile device spent disconnected from the Internet APN link (for example, the carrier's PDN service to access the Internet) while the Core Network is still connected to the IMS APN link (for example, the carrier's IMS), the present application can effectively determine the time a mobile device is off-loading from the carrier cellular data communication network and instead using the Wi-Fi, By monitoring signaling traffic that is a normal part of communications, Wi-Fi off-loading detection is done in a manner that is non-invasive to the mobile device's user. By monitoring the parameters shown in Table I, a network provider (for example, Verizon) can assess the throughput, or load factor of the network (for example, Verizon Network which includes Radio Access. Network 1 and Core Network 2, shown in FIG. 1).

Figure 8:
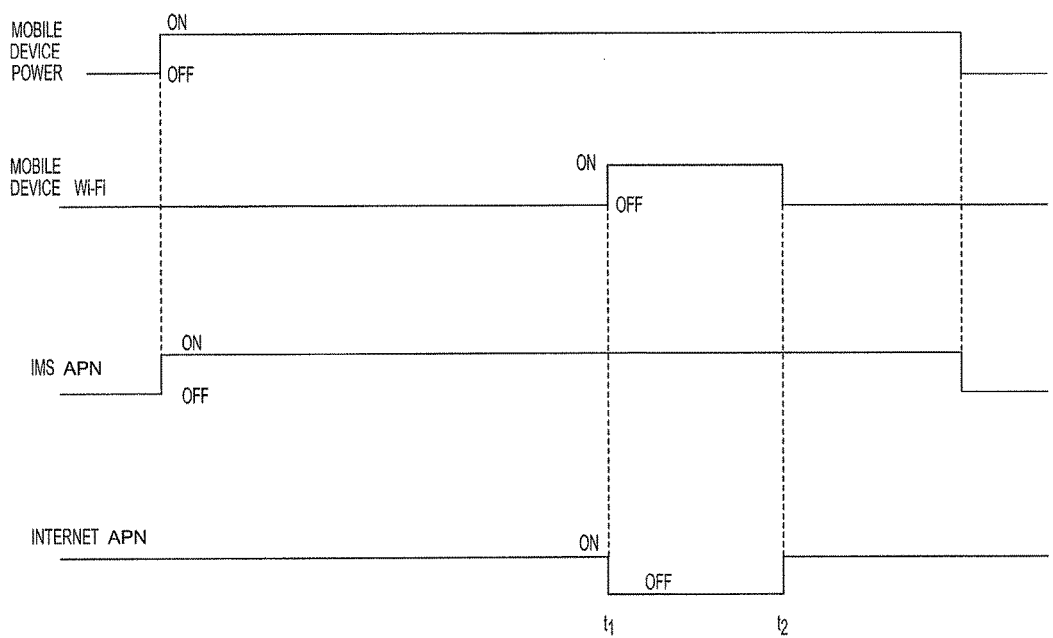
FIG. 8 is a timing diagram showing a mobile device communicating through the IMS Network while connected to the Internet APN and, at a different time, connected to a separate Wi-Fi network via a router, as shown in FIG. 1.

FIG. 8 shows a flow diagram for a non-invasive method for determining when a mobile device is using the network service provider's Internet access service and when the mobile device is leaving the carrier's Internet access service for Wi-Fi. As shown; the mobile device is turned ON by the user. After passing authentication, authorization and accounting checks via Core Network 2, the device is permitted to communicate through the network service provider's IMS (IMS APN ON for example) and the network service provider's Internet (Internet APN ON for example). Between time $t_1$ and $t_2$ the mobile device is connected to Wi-Fi by the user. As a result, the Internet APN is disconnected, as shown, between time $t_1$ and $t_2$ while the IMS APN remains ON. Time $t_1$ is identified upon detecting the particular UE mobile device disconnected from the PDN (based on a Delete Session Request while the link based on the IMS APN is not disconnected); and time $t_2$ is identified upon detecting the particular UE mobile device is reconnected to the PDN (based on a new Create Session Request, while the link based on the IMS APN has remained active). Subtracting the time that the link for Internet APN for the PDN service is OFF (the difference between $t_1$ and $t_2$) from the time that the link for the IMS APN is ON determines the time that the user left the provider's Network's Internet and used his/her's Wi-Fi.

Obtaining the duration of time that a mobile device leaves the cellular network of the network provider and communicates over Wi-Fi can be used to determine how much of the customer's data traffic is being off-loaded to a Wi-Fi Network.

It is advantageous for a network provider to know when and how much of data traffic that otherwise would use its LTE network is being off-loaded to a Wi-Fi network. The Wi-Fi off-load question is relevant, for example, during a large sports event, when the network provider may be operating its own Wi-Fi network, in addition to its own 3G, or 4G LTE network, to reduce traffic loading on its LTE network resources. A network provider may also want to know the Wi-Fi off-load factor for daily operations, such as how much of its own subscribers are off-loading their smartphone data traffic to a home Wi-Fi network (for example). The off-load factor can be calculated by forming a ratio between the total time that all smartphone data traffic is on the network provider's network and the total time that all smartphone data traffic is on the home Wi-Fi network (for example).

In general, knowing the Wi-Fi off-load factor helps the network provider determine how much is being saved using Wi-Fi, as compared to extending its own cellular network (for example, adding Cell-on-Wheels capability in a sports arena). Knowing the Wi-Fi off-load factor helps the network provider estimate and plan for large events. Hence, a need exists for providing a non-invasive method and system to detect that a device (for example, an Android device) is transmitting over Wi-Fi, instead of a cellular network.

The Wi-Fi transition detections and related determinations of time durations of Wi-Fi off-loading can be processed and provided to personnel of the network service provider/carrier in a variety of different ways and for a variety of different purposes. The information may be processed and presented on request, e.g. for management analysis purposes, via any terminal device of carrier personnel having access to that information. The system may also be configured to compare results to thresholds or other reporting criteria and send results for which applicable criteria are met. The notification criteria may relate to Wi-Fi offloading (e.g. large amount of off-loading by devices served by particular eNodeB(s) or to other network events. For example, the carrier typically has equipment (not separately shown) that monitors traffic through the cellular network. When such equipment determines that a section of network, e.g. receiving service via particular eNodeB(s), is subject to high loading or data traffic volume; the equipment may request the Wi-Fi offloading information for mobile devices identified as operating in that section of the network during times before, during and/or after the period of high loading or data traffic volume. Carrier analysis and response to the LTE loading can be refined based on the knowledge of concurrent Wi-Fi offloading activities.

As outlined above, the monitor system probe 10 captures connect and disconnect times for activities of particular mobile devices, and in so doing, captures an identifier (e.g. IMSI or MDN) for each of those mobile devices. The Wi-Fi offloading times can be correlated to identifications of particular mobile devices and processed accordingly. If the system also obtains at least some device location information, e.g. identifies the eNodeB (and thus its location) for the sustained IMS APN related link during the off-load by each mobile device, then the carrier can also process the off-load data of particular devices vis-à-vis locations where they often off-load data as opposed to other locations where off-loading is less frequent.

The aforementioned information may, be used to better allocate and manage the resources of a network provider. The off-loading factor of the cellular network may be calculated as a function of time at specified locations. The results of off-loading factor may be displayed on a monitor and/or stored in a database.

Figure 9:
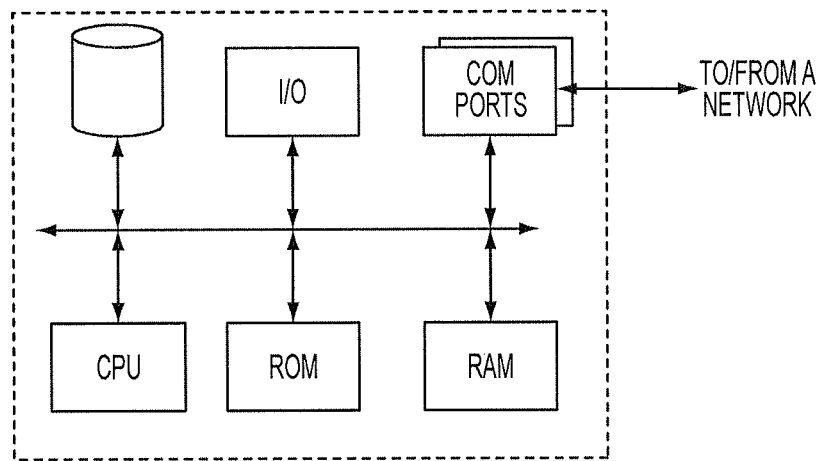
FIGS. 9 and 10 provide functional block diagram illustrations of general purpose computer hardware platforms.
Figure 10:
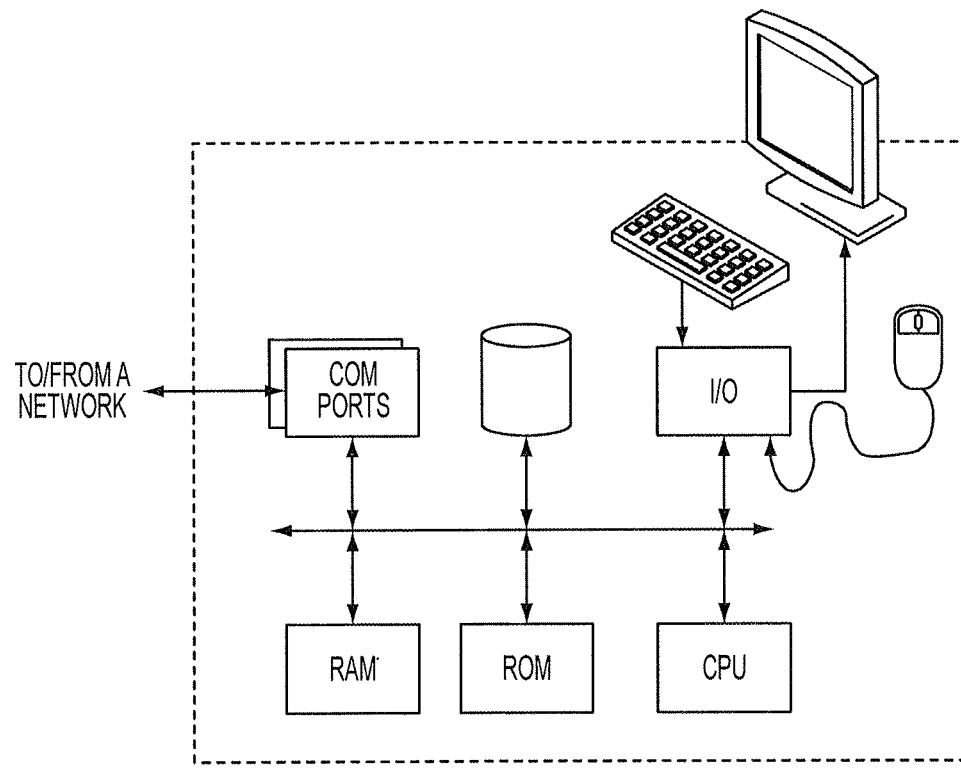

Referring last to FIGS. 9 and 10, there are shown functional block diagram illustrations of general purpose computer hardware platforms that can be used to implement processor station 11 and database 12. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server, if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms to distribute the processing load.

A computer type user terminal device, such as a PC or tablet computer, similarly includes a data communication interface, CPU, main memory and one or more mass storage devices for storing user data and the various executable programs. A mobile device type user terminal may include similar elements, but typically uses smaller components that also require less power to facilitate implementation in a portable form factor. The various types of user terminal devices also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices are conventional in nature, and it is presumed that those skilled in the art are adequately familiar therewith.

Hence, aspects of the methods of monitoring network messages and determining when communications transition between cellular usage and Wi-Fi usage outlined above and analyzing the transition and/or usage data may be embodied in programming. Program aspects of the technology may be thought of as "products" or "articles of manufacture" typically in the form of executable code and/or associated data that is carried on or embodied in a type of machine readable medium. Storage type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, or loading from a management server or host computer of the telephone service provider into the computer platform running the data preparation process. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as computer or machine readable medium refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement database 12 shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to an appropriate computer or the like, such as processor station 11 for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A method comprising:
    monitoring, by one or more devices, messages relating to communications of mobile devices through a cellular network;
    receiving, by the one or more devices and based on monitoring the messages, a first subset of the messages that includes a create session request and an identifier of a particular mobile device of the mobile devices,
        the particular mobile device requesting creation of a communication session via the cellular network;
    obtaining, by the one or more devices and based on the create session request, a first time stamp associated with the creation of the communication session;
    receiving, by the one or more devices and based on monitoring the messages, a second subset of the messages that includes a delete session request and the identifier of the particular mobile device,
        the second subset of the messages being received upon termination of the communication session via the cellular network;
    obtaining, by the one or more devices and based on the delete session request, a second time stamp associated with the termination of the communication session,
        the particular mobile device being disconnected from an Internet service provided by the cellular network after the termination of the communication session, and
        a core network of the cellular network being connected to an Internet Protocol Multimedia Subsystem (IMS) service after the termination of the communication session;
    calculating, by the one or more devices, a time difference between the first time stamp and the second time stamp,
        the time difference providing an indication of a time period in which the particular mobile device is transmitting data via a wireless router rather than via the cellular network; and
    providing, by the one or more devices, the indication of the time period in which the particular mobile device is transmitting data via the wireless router rather than via the cellular network.

2. The method of claim 1, further comprising:
    receiving one create session request based on an access point name (APN) for the IMS service; and
    receiving another create session request based on another APN for the Internet service,
        the delete session request being based on the other APN.

3. The method of claim 2, further comprising:
    disconnecting the particular mobile device from the Internet service based on the other APN; and
    maintaining a connection with the IMS service for the particular mobile device.

4. The method of claim 1, further comprising:
    determining an off-load factor based on the first subset of the messages and the second subset of the messages.

5. The method of claim 4, further comprising:
    utilizing the off-load factor to develop a plan to reduce adverse loading on the cellular network.

6. The method of claim 1, wherein the wireless router is configured to access the Internet service without first accessing the core network.

7. The method of claim 6, wherein the cellular network includes a radio access network for communicating with the core network that includes an IMS service access point name (APN) and an Internet service APN.

8. The method of claim 1, wherein the particular mobile device includes:
    a first application for activating the communication session via the cellular network, and
    a second application for communicating with the Internet service via the wireless router.

9. The method of claim 1, further comprising:
    monitoring links in the cellular network.

10. The method of claim 9, wherein the links include at least one of:
    an S1U interface,
    an S5 interface, or
    an S11 interface.

11. A method comprising:
receiving, by a device and from a mobile device, a first request for establishing a communication session via a cellular network associated with the device;
authorizing, by the device and based on the first request, the mobile device for the communication session via the cellular network;
obtaining, by the device, a first time stamp based on authorizing the mobile device;
receiving, by the device and from the mobile device, a second request for establishing a wireless session via a wireless network;
obtaining, by the device and based on the second request, a second time stamp associated with establishing the wireless session;
determining, by the device, that the mobile device has disconnected from an Internet service provided by the cellular network, based on the second time stamp;
a core network of the cellular network being connected to an Internet Protocol Multimedia Subsystem (IMS) service after the mobile device has disconnected from the Internet service provided by the cellular network;
determining, by the device, a time difference between the first time stamp and the second time stamp,
the time difference providing an indication of a time period in which the mobile device is transmitting data via the wireless network rather than via the cellular network; and
providing, by the device, the indication of the time period in which the mobile device is transmitting data via the wireless network rather than via the cellular network.

12. The method of claim 11, wherein the second request includes a delete session request.

13. The method of claim 11, wherein the first request includes a create session request.

14. The method of claim 11, further comprising:
requesting a first access point name (APN) associated with the IMS service and a second APN associated with the Internet service.

15. The method of claim 14, wherein the IMS service is provided by an IMS network that includes the core network.

16. The method of claim 11, where the mobile device includes:
a first application for activating the communication session with the cellular network, and
a second application for communicating with the Internet service via the wireless network.

17. The method of claim 11, further comprising:
determining an off-load factor based on a total number of mobile devices transmitting data via the wireless network rather than via the cellular network.

18. A system, comprising:
a memory to store processor-executable instructions; and
one or more processors, to execute the processor-executable instructions in the memory, to:
receive messages associated with communications of a mobile device via a cellular network,
the messages including:
a first subset of the messages that includes a create session request and an identifier of the mobile device,
the create session request requesting creation of a communication session via the cellular network, and
a second subset of the messages that includes a delete session request and the identifier of the mobile device,
the second subset of the messages being received upon a termination of the communication session via the cellular network;
determine a first time stamp corresponding to the create session request, the first time stamp being associated with the creation of the communication session;
determine a second time stamp corresponding to the delete session request,
the second time stamp being associated with the termination of the communication session,
the mobile device being disconnected from an Internet service provided by the cellular network after the termination of the communication session, and
a core network of the cellular network being connected to an Internet Protocol Multimedia Subsystem (IMS) service after the termination of the communication session;
calculate a time difference between the first time stamp and the second time stamp,
the time difference providing an indication of a time period in which the mobile device is transmitting data via a wireless router rather than via the cellular network; and
provide the indication of the time period in which the mobile device is transmitting data via the wireless router rather than via the cellular network.

19. The system of claim 18, wherein:
the cellular network includes a gateway to the Internet service, and
the create session request includes a request to access the Internet service through the gateway.

20. The system of claim 19, wherein the delete session request includes a request to cancel access to the Internet service through the gateway.

* * * * *